United States Patent [19]

Beugelsdyk et al.

[11] 4,413,466
[45] Nov. 8, 1983

[54] CONTROL ASSEMBLY FOR BLADE CLUTCH UNIT

[75] Inventors: Anthony F. Beugelsdyk, Wichita; Terence J. Stuchlik, Emporia; Bruce J. Kester, Wichita, all of Kans.

[73] Assignee: Conchemco, Incorporated, Lenexa, Kans.

[21] Appl. No.: 338,480

[22] Filed: Jan. 11, 1982

[51] Int. Cl.³ .............................................. A01D 75/20
[52] U.S. Cl. .................................. 56/11.3; 56/11.8; 180/19 H; 180/272; 192/99 S
[58] Field of Search .................. 56/10.8, 11.3, 11.8, 56/10.2, 10.5; 192/99 S; 74/483 R; 180/19.3, 272, 273

[56] References Cited
U.S. PATENT DOCUMENTS

| | | | |
|---|---|---|---|
| 3,800,616 | 4/1974 | Hoffmeyer | 74/470 |
| 3,942,604 | 3/1976 | Black | 180/103 R |
| 4,048,788 | 9/1977 | Kamlukin | 56/11.3 |
| 4,132,280 | 1/1979 | Jones | 180/19 H |
| 4,167,221 | 9/1979 | Edmonson | 180/19 H |
| 4,212,141 | 7/1980 | Miyazawa | 56/11.8 |
| 4,230,200 | 10/1980 | Carolan | 180/272 |
| 4,281,732 | 8/1981 | Hoch | 180/19 H |
| 4,295,326 | 10/1981 | Green | 56/11.3 |
| 4,309,862 | 1/1982 | Carlson | 56/10.5 |
| 4,327,539 | 5/1982 | Bricko et al. | 56/11.3 |
| 4,362,283 | 12/1982 | Plamper et al. | 56/11.3 |
| 4,363,206 | 12/1982 | Schmitt | 56/11.3 |

Primary Examiner—Gene Mancene
Assistant Examiner—David I. Tarnoff
Attorney, Agent, or Firm—Schmidt, Johnson, Hovey & Williams

[57] ABSTRACT

A compact safety control apparatus and method for powered lawnmowers having a cable actuated clutch between the motor and blade thereof is provided which includes a "dead man" function along with an operating mechanism requiring two distinct steps for engaging the clutch and initiating rotation of the lawnmower blade. The control apparatus preferably includes a shiftable handle, a coupler responsive to shifting of the handle, a depressible push button for moving the coupler into engagement with an end fitting on the actuating cable, and a pivotally mounted ramp for selectively disengaging the coupler and the end fitting. In operation, the coupler is moved by operation of the handle into a position adjacent the end fitting of the actuating cable, the push button is depressed to engage the coupler with the end fitting, and the handle is shifted to move the coupler, cable end fitting and cable, thereby engaging the clutch. The cable is releasably locked in position by the interengagement of the coupler and the cable end fitting as long as the handle is held in position by the operator. Upon release of the handle, the cable shifts under influence of a biasing spring, and the ramp interposed in the path of travel of the cable end fitting and coupler serves to disengage the coupler and cable end fitting.

12 Claims, 8 Drawing Figures

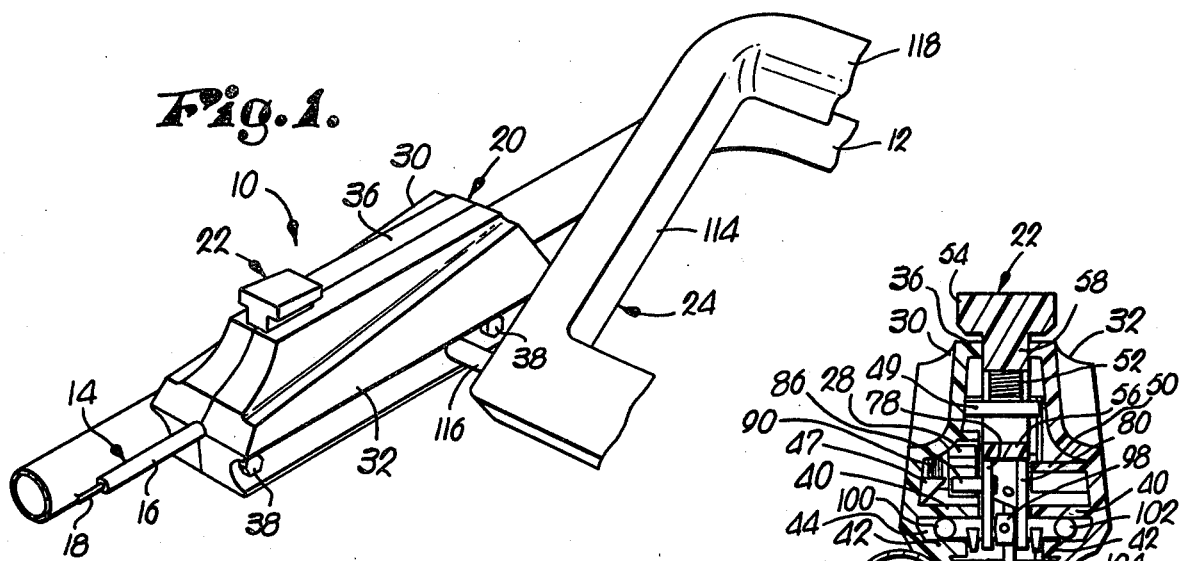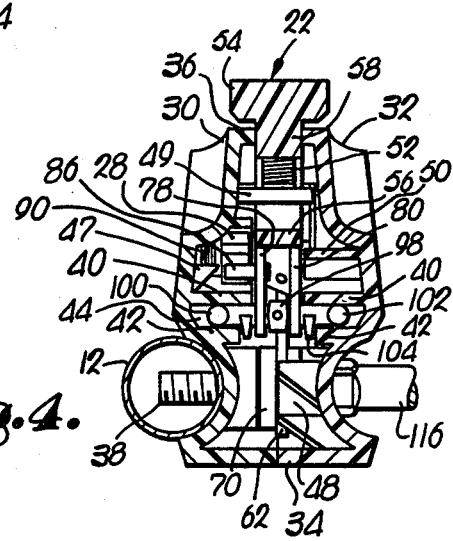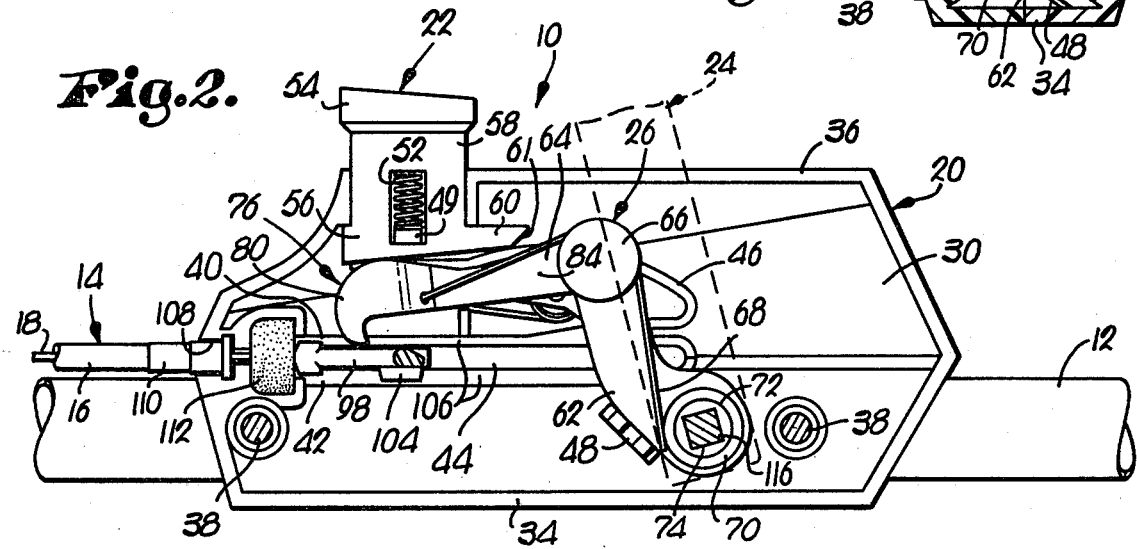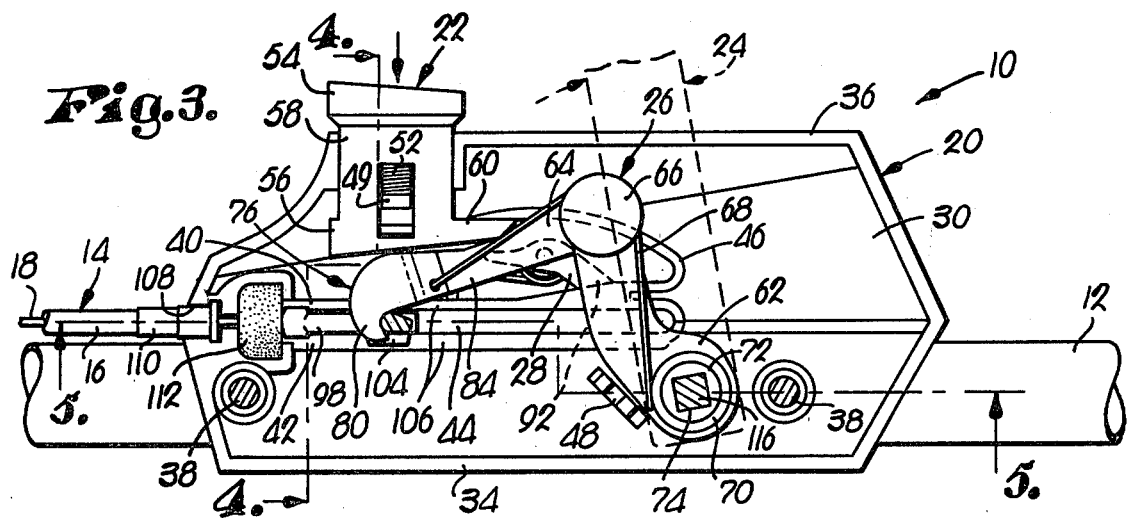

CONTROL ASSEMBLY FOR BLADE CLUTCH UNIT

BACKGROUND OF THE INVENTION

1. Field of the Invention

The present invention is concerned with an improved control apparatus, and a corresponding method, for use on walk-behind lawnmowers of the type having a clutch interposed between the motor and blade thereof, and having an elongated cable for clutch operation. More particularly, it is concerned with such a control apparatus and method which provides a desirable "dead man" function, along with a two step procedure for engaging the clutch and initiating blade rotation.

2. Description of the Prior Art

So-called walk-behind rotary powered mowers are well known and in widespread use. Generally speaking, such mowers include a lowermost housing supported on spaced wheels, with a gasoline powered engine coupled to a rotary mower blade disposed within the housing. An elongated handle is affixed to the housing at the rear thereof, so that the user simply pushes the mower in a "walk-behind" fashion.

In recent years the government has promulgated a number of safety regulations relating to mowers of the type described. For example, such mowers must now be equipped with a so-called "dead man" switch which generally includes a spring-biased handle which is grasped by the operator during normal operation of the mower. If the handle is thereafter released, mowing action is rapidly terminated for reasons of safety. Such termination may be by way of stopping the motor, or through a clutch mechanism operatively coupled with the handle which disengages the blade from the motor when the handle is released.

In addition, it has now been proposed that walk-behind mowers be provided with a control apparatus requiring two distinct actions to restart the rotary blade thereof when it has ceased operation.

In view of these regulations, there has been considerable effort on the part of mower manufacturers and suppliers to develop a low cost, compact, reliable and easy to use control apparatus which meets the new regulations.

SUMMARY OF THE INVENTION

The present invention relates to a control apparatus for walk-behind mowers which satisfies all presently existing and proposed safety standards. Broadly speaking, the apparatus hereof includes a shiftable handle, a moveable coupling mechanism responsive to shifting of the handle, a depressible push button for moving the coupler into engagement with an end fitting on the clutch actuating cable, and a pivotally mounted ramp for disengaging the coupler from the cable end fitting.

In particularly preferred forms the shiftable handle includes an attachment for grasping by the operator, and the coupler includes first and second lever arms connected together and respectively pivotal about a common axis and biased apart by means of a torsion spring. The depressible push button is spring biased to a non-depressed position. The ramp is configured and pivotally mounted for closing the coupler and cable end fitting during shifting of the handle to the clutch-engaged position thereof, but is designed for disengaging the coupler and cable end fitting when the handle is released.

BRIEF DESCRIPTION OF THE DRAWINGS

FIG. 1 is a fragmentary perspective view illustrating the control apparatus of the present invention operatively mounted on the main handle of a walk-behind powered lawnmower;

FIG. 2 is a vertical sectional view of the control apparatus, with the coupler in position adjacent to the cable end fitting, and with phantom lines indicating the position of the handle;

FIG. 3 is similar to FIG. 2, but with the push button depressed and the coupler engaging the cable end fitting;

FIG. 4 is a sectional view taken along line 4—4 of FIG. 3;

DESCRIPTION OF THE PREFERRED EMBODIMENT

Figure 5:
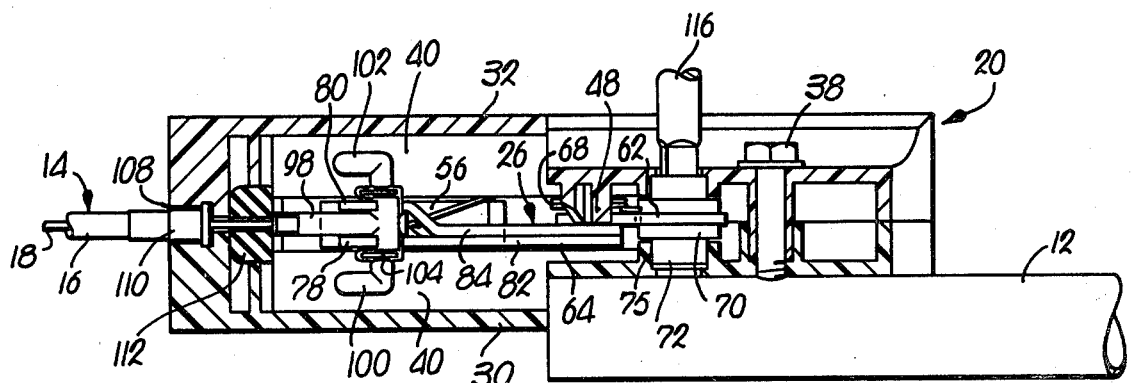
FIG. 5 is a sectional view taken along line 5—5 of FIG. 3.

Turning now to the drawings, a control apparatus 10 is depicted in FIG. 1 as it would appear when operatively mounted on the U-shaped main handle 12 of a walk-behind powered lawnmower. A clutch actuating cable 14 extends from apparatus 10 and is operatively connected to a conventional clutch unit coupled between the lawnmower motor and the rotary blade thereof (not shown). Cable 14 is of conventional construction, and includes an outer casing 16, and an internal longitudinally shiftable metallic element 18.

Control apparatus 10 broadly includes a housing 20, moveable operating means preferably in the form of a depressible push button 22, shiftable handle means 24, an operating mechanism or coupler 26, and a pivotally mounted ramp 28.

In more detail, housing 20 includes a pair of spaced apart, irregularly shaped sidewalls 30, 32, a bottom wall 34, and a top wall 36. The housing 20 is advantageously formed of an appropriate synthetic resin material and is coupled to handle 12 by means of bolts or other fasteners 38 extending through the main handle 12 and the sidewalls 30, 32.

Sidewalls 30, 32 each include a pair of elongated, inwardly extending projections 40, 42 which cooperatively define an elongated guide channel 44 on each sidewall 30, 32. Sidewall 30 is provided with an irregularly shaped, yet generally arcuate inwardly extending projection 46 that at one end is integral with projection 40. A torsion spring stop 47 and a push button spring stop 49 also project inwardly from the sidewall 30, as best seen in FIG. 4. A coupler limiting stop 48 and a guide rib 50 project inwardly from sidewall 32.

The push button 22 extends through top wall 36 and is biased to an upper rest position by spring 52. The button 22 includes a cap portion 54, a coupler-engaging lower portion 56, and an intermediate shank portion 58 between the cap 54 and coupler-engaging portion 56. The coupler-engaging portion 56 includes a rightwardly extending (as viewed in FIG. 2) projection 60 terminating in a beveled cam surface 61.

The coupler 26 includes two lever arms 62, 64 connected together at a common axis by a pin 66. A torsion spring 68 is mounted on the pin 66 and has a pair of elongated arms respectively engaging the lever arms 62, 64 so as to bias the arms 62, 64 apart. A mounting bracket 70 extends outwardly from either side of lever arm 62 on the end of lever arm 62 opposite connecting pin 66. Mounting bracket 70 has a cylindrical housing-engaging outer surface 72 and a recess therethrough presenting a square columnar handle-receiving inner surface 74. As best seen in FIG. 2, the bracket 70 is rotatably received within complemental opposed openings 75 respectively formed in the sidewalls 30, 32. The end of lever arm 64 opposite the connecting pin 66 is in the form of a bifurcated, downwardly opening hook 76. The adjacent tangs 78, 80 of bifurcated hook 76 are formed from a generally planar level arm section 82 and a second lever arm section 84 that is partially contiguous with and riveted to a first lever arm section 82, but angled away and spaced apart from first lever section 82 at the end of lever arm 64 opposite connecting pin 66. A ramp-engaging pin 86 extends outwardly from tang 78, normal to the planar surface of lever arm 82.

Figure 7:
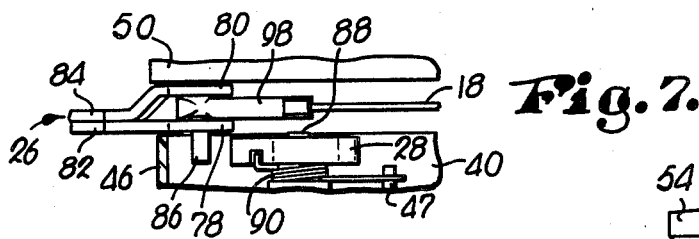
FIG. 7 is a sectional view taken along line 7—7 of FIG. 6.

The ramp 28 is pivotally mounted on a pin 88 that protrudes through and is supported by the sidewall 30. A torsion spring 90 (FIG. 7) biases the ramp 28 to a rest position such that end 92 of ramp 28 is in contact with projection 46 at the point projection 46 joins and is integral with projections 40. Ramp 28 has an irregular structure resembling the shape of a duck head. As best seen in FIG. 3, ramp 28 includes an arcuate coupler-disengaging upper surface 94 and a lower surface 96 that is spaced apart at one end from projection 40, but angles downwardly and rightwardly so that surface 96 is in contact with projection 46 when ramp 28 is in the rest position thereof.

The end of cable 14 within housing 20, and particularly metallic element 18, is provided with a metallic T-shaped end portion fitting 98. The fitting 98 includes two laterally extending right angled projections 100, 102 which cooperatively form the cap of the T. Each projection 100, 102 is fitted with a depending inboard shoulder 104. As best seen in FIG. 4, the right angled projections 100, 102 are respectively positioned in the associated guide channels 44 defined by the housing wall projections 40, 42 of sidewalls 30, 32. The shoulder 104 of each projection 100, 102 abuts the outermost surfaces 106 of the housing projections 40, 42. Thus, it will be perceived that the fitting 98 and thereby element 18 of cable 14, are guided for smooth fore-and-aft reciprocation between the projections 40, 42.

As seen for example in FIG. 2, housing 20 is provided with an irregular aperture 108 therethrough adjacent the forward end thereof closest to the lawnmower motor. The cable 14 extends into aperture 108, and the casing 16 thereof is dead-ended within the aperture by means of a metallic ferrule 110. A resilient, centrally apertured shock-absorbing pad 112 is situated within aperture 108 adjacent the interior of housing 20. As can be seen, the metallic element 18 extends from the ferrule 110 through the aperture 108 of pad 112 and is ultimately connected to fitting 98.

The handle 24 includes a grip 114, and a coupler connecting pivot pin 116. The grip 114 has an elongated grasping rod 118 which is shiftable to a position adjacent the outermost end of handle 12 so that a user can conveniently grasp both handle 12 and rod 118 during normal operation of the mower.

The operation of control apparatus 10 will now be described, and particularly with reference to FIGS. 2, 3, 6 and 8 which illustrate an operational sequence.

Referring first to FIG. 2, apparatus 10 is shown in a configuration wherein the lawnmower clutch is disengaged, i.e. rotation of the lawnmower blade has ceased. In this configuration it will be observed that the cable element 18 is shifted leftwardly as seen in FIG. 2, with fitting 98 in a clutch-disengaged rest position adjacent shock-absorbing pad 112.

The first step in engaging the motor blade involves shifting the handle 24 to a position as shown in FIG. 2, wherein the coupler 26 is shifted to a position adjacent and directly above the cable end portion fitting 98. With the coupler 26 in this position, the push button 22 is depressed (as shown in FIG. 3) to engage the upper surface of bifurcated hook 76 and thereby pushes the hook downwardly until the tangs 78, 70 respectively engage the projections 100, 102 of fitting 98.

Once the cable end portion fitting 98 is engaged by the coupler 26, handle grip 114 is grasped and pulled rightwardly, as viewed in FIG. 3, thus causing the fitting 98, and thereby metallic element 18 of cable 14, to be shifted rightwardly. The projections 102, 104 of fitting 98 are guided for smooth translation by virtue of the channels 44 defined by the projections 40, 42.

Figure 6:
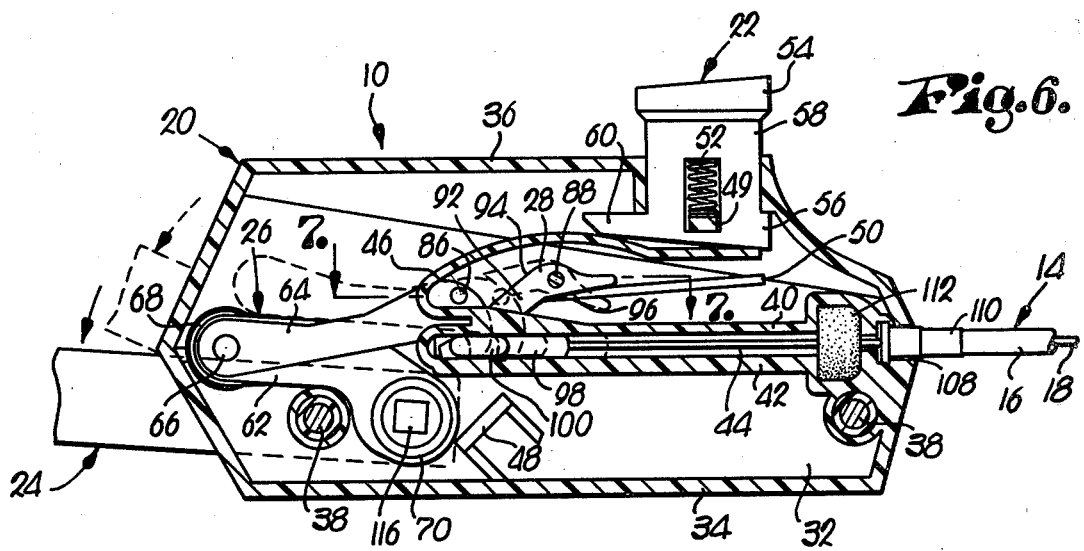
FIG. 6 is a sectional view of the control apparatus with the coupler engaged and with the cable end fitting and the cable fully extended to the clutch engaged position, including phantom lines showing the orientation of the handle coupler and ramp just prioer to the cable reaching its fully extended, clutch engaged position.

As lever arm 64 of coupler 26 is shifted rightwardly, the pin 86 located on lever arm 64 is shifted between ramp 28 and housing projection 40, and the pin 86 thereby comes into contact with lower surface 96 of ramp 28. The interaction of pin 86 with the ramp 28 pivots ramp 28 in opposition to the bias provided by torsion spring 90 and the pin 86 thereby clears and passes ramp 28 (as best shown in FIG. 6). The bias provided by torsion spring 90 thereupon returns the ramp 28 to a rest position abutting projection 46, once the pin 86 has been shifted fully past the ramp 28.

The described shifting of cable end fitting 98 along the channels 44 away from the rest position adjacent shock-absorbing pad 112 also shifts cable metallic portion 18 and thereby engages the lawnmower clutch. The lawnmower clutch will remain engaged so long as the handle grip 114 is firmly grasped by the operator so as to maintain the cable end fitting 98 in the clutch engaged position thereof.

Figure 8:
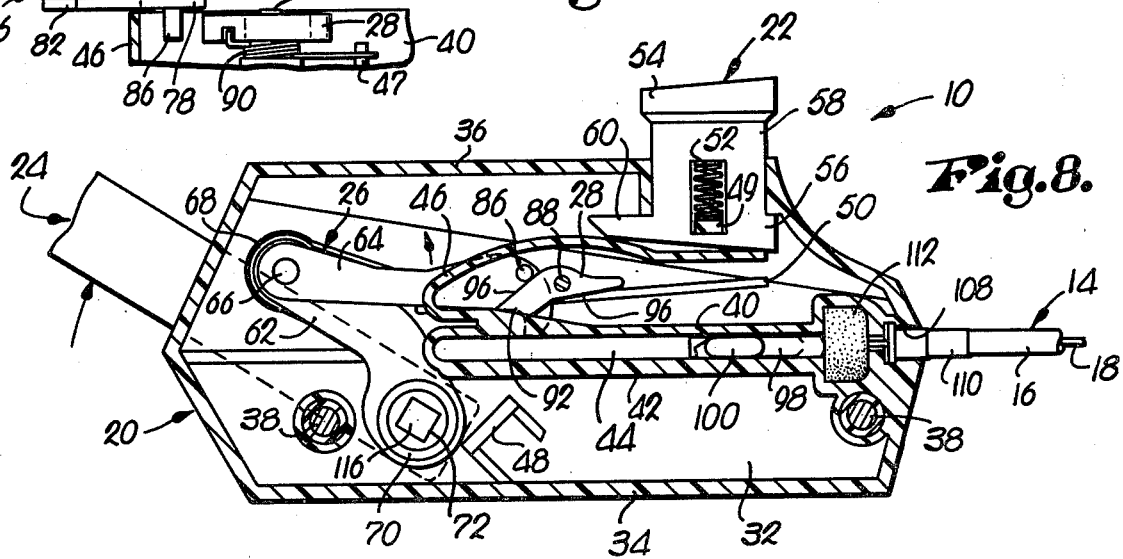
FIG. 8 is a sectional view of the control apparatus subsequent to release of the "dead man" handle, with the coupler engaging the coupler disengaging ramp and with the cable end fitting disengaged from the coupler.

When the handle grip 114 is released by the operator, cable end fitting 98 and element 18 are shifted under the influence of a biasing spring located at the clutch (not shown) to the rest position wherein the cable end fitting 18 abuts pad section 112. As the cable end fitting 98 is shifted towards its rest position, the coupler 26, still in engagement with the end fitting 98, is also drawn towards the pad section 112. During such shifting, the pin 86 engages the upper cable-disengaging surface 94 of the ramp 28, as shown in FIG. 8. Interaction of the pin 86 and ramp 28 results in separation of the lever arm 64 (and thereby coupler 26) from the cable end fitting 98. With the cable end fitting 98 thus disengaged from the coupler 26, the fitting 98 and element 18 are free to rapidly move to their rest positions, so as to disengage the lawnmower clutch. Moreover, it will be seen that the cable element 18 cannot be shifted back to the clutch-engaged position thereof unless the described two-step procedure is followed.

Those skilled in the art will note that when the push button 22 is in its fully depressed position, there is insufficient space to permit passage of lever arm 64 between fitting 98 and the portion 56 of push button 22. This feature prevents the operator from short circuiting the two-step clutch engaging process by permanently keeping the push button 22 in a depressed condition.

We claim:

1. A power lawnmower control apparatus for connection to a disengageable clutch coupling the lawnmower motor and blade, said apparatus comprising:
   movable operating means;
   shiftable handle means;
   cable means for operative connection to said clutch including an end portion biased to a first position corresponding to the disengaged position of said clutch and shiftable to a second position corresponding to the engaged position of said clutch; and
   operating mechanism, including—
      coupling means operatively connected to said handle means and shiftable to a position adjacent said cable end portion wherein said coupling means is engageable by said operating means upon movement thereof for coupling said coupling means with said cable end portion for thereafter causing movement of the cable end portion from said first to said second position thereof upon shifting of the handle means; and
      means engageable with said coupling means for disengaging said coupling means from said cable end portion when said handle means is released and said cable end portion moves from said second toward said first position thereof.

2. Apparatus as set forth in claim 1, said coupling means including first and second spring biased lever arms connected together and respectively pivotal about a common axis.

3. Apparatus as set forth in claim 1, said handle means including structure oriented for grasping by the operator of said lawnmower during cutting operations therewith in order to maintain said cable end portion in said second position thereof.

4. Apparatus as set forth in claim 1, said disengaging means comprising a pivotally mounted ramp presenting a disengaging surface.

5. Apparatus as set forth in claim 4, including means biasing said ramp to a rest position wherein said disengaging surface is oriented so as to disengage said coupling means from said cable end portion, when said cable end portion moves from said second toward said first position.

6. Apparatus as set forth in claim 5, said ramp presenting a second surface for contacting said coupling means and maintaining said coupling means in engagement with said cable end portion during the shifting of said cable and portion from said first to said second position.

7. Apparatus as set forth in claim 1, said operating means being shiftable between a rest position and an operating position, said operating means including structure for preventing said coupling means from shifting to said position adjacent said cable end portion when said operating means is in said operating position.

8. Apparatus as set forth in claim 7, including means for biasing said operating means to said rest position.

9. A method of engaging the clutch of a power lawnmower to initiate rotation of the blade thereof, there being a shiftable operating cable coupled to the clutch for engaging the same, said method comprising the steps of:
   shifting a handle means, and, as a result of said shifting thereof, causing a shiftable coupling means to be operatively positioned in a first position adjacent to but in non-engaging alignment with an end portion of said cable;
   depressing an operating means for shifting said coupling means to a second position spaced apart from said first position wherein said coupling means are in engageable alignment with said end portion; and
   shifting said handle, and, as a result of shifting said handle, shifting said coupling means and cable to engage said clutch.

10. The method as set forth in claim 9, including the step of releasably locking said cable in a clutch engaging position.

11. A power lawnmower control apparatus for connection to a disengageable clutch coupling the lawnmower motor and blade, said apparatus comprising:
    movable operating means;
    shiftable handle means;
    cable means for operative connection to said clutch including an end portion biased to a first position corresponding to the disengaged position of said clutch and shiftable to a second position corresponding to the engaged position of said clutch; and
    operating mechanism, including—
       coupling means operatively connected to said handle means and shiftable to a position adjacent said cable end portion wherein said coupling means is engageable by said operating means upon movement thereof for coupling said coupling means with said cable end portion for thereafter causing movement of the cable end portion from said first to said second position thereof upon shifting of the handle means; and
       means engageable with at least one of said coupling means of said cable end portion for disengaging said coupling means and said cable end portion when said handle means is released and said cable end portion moves from said second toward said first position thereof.

12. An apparatus as set forth in claim 11, said disengaging means engageable with said coupling means.

* * * * *